United States Patent
Osborn et al.

(10) Patent No.: US 9,718,355 B2
(45) Date of Patent: Aug. 1, 2017

(54) VEHICLE AND METHOD OF CONTROLLING A VEHICLE

(71) Applicant: Jaguar Land Rover Limited, Whitley Coventry Warwickshire (GB)

(72) Inventors: Russell Osborn, Warwick (GB); Ian Beverley, Warwick (GB); Brett Hallam, Moreton in Marsh (GB); Mark Rathbone, Leamington Spa (GB); Steve Mullane, Southam (GB); Shaun Wick, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/881,532

(22) Filed: Oct. 13, 2015

(65) Prior Publication Data

US 2016/0039284 A1 Feb. 11, 2016

Related U.S. Application Data

(62) Division of application No. 14/114,439, filed as application No. PCT/EP2012/057937 on Apr. 30, 2012, now abandoned.

(30) Foreign Application Priority Data

Apr. 28, 2011 (GB) .................................. 1107137.0
Apr. 28, 2011 (GB) .................................. 1107138.8

(51) Int. Cl.
*F16H 48/22* (2006.01)
*B60K 23/08* (2006.01)
(Continued)

(52) U.S. Cl.
CPC ............ *B60K 23/08* (2013.01); *B60K 17/344* (2013.01); *B60K 17/35* (2013.01); *B60K 23/04* (2013.01);
(Continued)

(58) Field of Classification Search
None
See application file for complete search history.

(56) References Cited

U.S. PATENT DOCUMENTS 3,296,895 A 1/1967 Karlsson
5,005,663 A * 4/1991 Niide ................. B60K 17/3462
180/247

(Continued)

FOREIGN PATENT DOCUMENTS

DE 102008037885 A1 3/2010
EP 1533166 A2 5/2005
(Continued)

OTHER PUBLICATIONS

GB Combined Search and Examination Report for corresponding application No. 1107138.8, dated Aug. 12, 2011, 6 pages.
(Continued)

*Primary Examiner* — Justin Holmes
(74) *Attorney, Agent, or Firm* — Reising Ethington P.C.

(57) ABSTRACT

A vehicle having a four-wheel-drive system including an auxiliary portion that has an auxiliary driveshaft and drive means between the auxiliary driveshaft arranged to releasably connect a second group of wheels to the driveline via a releasable torque transmitting device. The releasable torque transmitting device is operable to allow slippage of the input portion with respect to the output portions, thereby to vary an amount of torque that is transmitted to the second group of wheels.

15 Claims, 9 Drawing Sheets

(51) Int. Cl.
*B60K 17/35* (2006.01)
*B60W 10/119* (2012.01)
*B60W 10/16* (2012.01)
*B60K 17/344* (2006.01)
*B60K 23/04* (2006.01)
*F16H 48/05* (2012.01)
*F16H 48/08* (2006.01)
*F16H 48/36* (2012.01)

(52) U.S. Cl.
CPC ....... *B60K 23/0808* (2013.01); *B60W 10/119* (2013.01); *B60W 10/16* (2013.01); *F16H 48/05* (2013.01); *F16H 48/08* (2013.01); *F16H 48/22* (2013.01); *F16H 48/36* (2013.01); *B60K 2023/043* (2013.01); *B60K 2023/046* (2013.01); *B60K 2023/0833* (2013.01); *B60K 2023/0858* (2013.01); *B60W 2710/027* (2013.01)

(56) References Cited

U.S. PATENT DOCUMENTS

| | | | |
|---|---|---|---|
| 5,105,901 A * | 4/1992 | Watanabe | B60K 23/0808 180/245 |
| 5,141,072 A | 8/1992 | Shibahata | |
| 5,311,787 A | 5/1994 | Wilson et al. | |
| 5,346,442 A | 9/1994 | Eastman | |
| 5,701,247 A | 12/1997 | Sasaki | |
| 6,945,347 B2 | 9/2005 | Matsuno | |
| 7,533,754 B2 | 5/2009 | Burrows et al. | |
| 8,535,194 B2 | 9/2013 | Juenemann et al. | |
| 8,608,611 B2 | 12/2013 | Ekonen et al. | |
| 2002/0153770 A1 | 10/2002 | Matsuno et al. | |
| 2003/0199359 A1 * | 10/2003 | Tucker-Peake | B60K 17/356 475/231 |
| 2005/0006164 A1 * | 1/2005 | Teraoka | B60K 1/00 180/243 |
| 2005/0103551 A1 | 5/2005 | Matsuno | |
| 2005/0121248 A1 * | 6/2005 | Ushiroda | B60K 23/0808 180/248 |
| 2006/0046888 A1 | 3/2006 | Puiu | |
| 2007/0192011 A1 | 8/2007 | Piyabongkarn et al. | |
| 2007/0193808 A1 * | 8/2007 | Perakes | B60K 6/445 180/242 |
| 2009/0277711 A1 | 11/2009 | Hoffmann et al. | |
| 2009/0288929 A1 | 11/2009 | Sandstrom et al. | |
| 2010/0044138 A1 | 2/2010 | Marsh et al. | |
| 2010/0062891 A1 | 3/2010 | Ekonen et al. | |
| 2010/0094519 A1 | 4/2010 | Quehenberger et al. | |
| 2011/0256976 A1 * | 10/2011 | Burgbacher | B60K 17/35 475/198 |
| 2011/0271781 A1 | 11/2011 | Takaira | |
| 2012/0024614 A1 | 2/2012 | Sigmund et al. | |

FOREIGN PATENT DOCUMENTS

| | | |
|---|---|---|
| EP | 1826089 A2 | 8/2007 |
| GB | 949029 A | 2/1964 |
| GB | 2407804 A | 5/2005 |
| JP | H02283919 A | 11/1990 |
| JP | H04127427 U | 11/1992 |
| JP | H1082431 A | 3/1998 |
| JP | 2010025170 A | 2/2010 |
| JP | 2010047107 A | 3/2010 |
| JP | 2010111214 A | 5/2010 |
| WO | WO2010085519 A1 | 7/2010 |

OTHER PUBLICATIONS

GB Combined Search and Examination Report for corresponding application No. 1207502.4, dated Aug. 14, 2012, 8 pages.
International Search Report for PCT/EP2012/057937 dated Aug. 31, 2012, 5 pages.
GB Combined Search and Examination Report for corresponding application No. 1207502.4, dated Jan. 8, 2013, 3 pages.
Notification of Reasons for Refusal corresponding to JP application No. 2014-506909, dated Dec. 8, 2015, 19 pages.

\* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

It is an aim of embodiments of the present invention to provide an improved dynamic driveline system.

SUMMARY

Embodiments of the present invention may be understood by reference to the appended claims.

In one aspect of the invention for which protection is sought there is provided a vehicle comprising: prime mover means; a first group of one or more wheels; a second group of two or more wheels; and a driveline to connect the prime mover means to the first and second groups of wheels such that the first group of one or more wheels is driven by the prime mover means when the driveline is in a first mode of operation and the second group of wheels is additionally driven by the prime mover means when the driveline is in a second mode of operation, the driveline including an auxiliary portion comprising an auxiliary driveshaft and drive means between the auxiliary driveshaft and the second group of wheels, the drive means having:
 an input portion;
 a plurality of output portions each operable to drive a respective different wheel of the second group of wheels;
 a first releasable torque transmitting means operable releasably to connect the input portion to the output portions thereby to allow the input portion to drive the output portions, the releasable torque transmitting means being operable to allow slippage of the input and output portions with respect to one another thereby to vary an amount of torque that is transmitted from the input portion to the output portions; and a differential arranged to allow the respective output portions to rotate at different respective speeds.

Some embodiments of the invention have the feature that a single releasable torque transmitting means (the first releasable torque transmitting means) provided within the drive means may be employed to isolate the auxiliary driveshaft from the second group of wheels.

In vehicles arranged such that the auxiliary driveshaft is driven permanently by the driveline this feature allows the second group of wheels to be disconnected from the auxiliary driveshaft.

In vehicles arranged such that the auxiliary driveshaft may be disconnected from the driveline, for example by means of a power transfer unit (PTU), the presence of the drive means allows the auxiliary driveshaft to be disconnected from the driveline and the rear wheels, allowing the auxiliary driveshaft to be brought to rest when the driveline is in the first mode of operation.

The use of releasable torque transmitting means operable to vary a proportion of the torque applied to the input portion that is transmitted to the output portions between at least first, second and third values allows the amount of torque to be modulated. In some embodiments slippage of clutch means of the releasable torque transmitting means is permitted to occur in order to accomplish this.

In some embodiments the drive means is arranged to allow a single releasable torque transmitting means to be removed and the drive means operated without the releasable torque transmitting means. This has the advantage that different versions of the drive unit may be provided, some versions allowing the auxiliary drive shaft to be disconnected from the second group of wheels (by means of the single releasable torque transmitting means) and some versions not allowing the auxiliary driveshaft to be disconnected, the latter not having the releasable torque transmitting means.

Advantageously the first releasable torque transmitting means may comprise clutch means.

In an embodiment the clutch means may comprise friction clutch means.

Still further advantageously the clutch means may comprise a wet friction clutch device.

Optionally the output portions of the drive means are arranged to provide torque to each one of a pair of side shafts of the vehicle, the side shafts being arranged to provide torque to respective different wheels of the second group of wheels.

Advantageously the drive means may comprise a ring gear arranged to be driven by the auxiliary driveshaft, the ring gear being coupled to an input portion of the first releasable torque transmitting means, an output of the first releasable torque transmitting means being operable to drive a cage of the differential.

This feature has the advantage that the ring gear may be brought to rest when the driveline is in the first mode of operation. Losses associated with rotation of the ring gear may therefore be substantially eliminated when the driveline is in the first mode.

It is to be understood that losses associated with ring gear rotation may be not inconsiderable in some arrangements. This is at least in part because in some arrangements the ring gear meshes with a corresponding bevel gear of the auxiliary driveshaft. A relatively large amount of pre-loading may be present between the ring gear and bevel gear.

In an embodiment the drive means comprises a ring gear arranged to be driven by the auxiliary driveshaft, the ring gear being arranged to drive a cage of the differential, a first of two outputs of the differential being coupled to an input of the first releasable torque transmitting means.

Optionally the output of the first releasable torque transmitting means provides a first output portion of the drive means and is arranged to drive a wheel of the second group of wheels, the second of two outputs of the differential providing a second output portion of the drive means and being arranged to drive another of the second group of wheels.

Optionally the first releasable torque transmitting means comprises an outer plate carrier and an inner plate carrier, the output of the first releasable torque transmitting means being driven by the outer plate carrier.

Thus it is to be understood that in some embodiments, when the second group of one or more wheels are turning as the vehicle moves with the driveline in the first mode, the output of the first releasable torque transmitting means drives the outer plate carrier.

This feature has the advantage that in the case that the friction clutch means comprises a wet friction clutch device, when the first releasable torque transmitting means is in the open condition the outer plate carrier is rotated when the corresponding wheel of the second group of wheels rotates, thereby promoting expulsion of fluid from between plates of the inner and outer plate carriers. This has the advantage of reducing drag when the first releasable torque transmitting means is in the open condition. It is to be understood that in some embodiments rotation of the ring gear when the vehicle is moving results in distribution of lubricant within the drive means (for example by 'churning') such that fluid is maintained between plates of the inner and outer plate carriers. When the ring gear is stationary this fluid is able to drain from between the plates when the outer plate carrier rotates relative to the inner plate carrier, thereby reducing a drag force on the outer plate carrier as it rotates.

In an embodiment the drive means is operable to bring the ring gear to rest when the driveline is in the first mode of operation.

In an embodiment the vehicle comprises means for asymmetrically distributing torque between the plurality of output portions of the drive means when the vehicle is driven.

This feature has the advantage that if respective left and right wheels of the second group of wheels are on surfaces offering different respective maximum values of tractive torque to the wheels, different amounts of torque may be applied to the respective wheels to reduce a risk of wheel slip.

In an embodiment the means for asymmetrically distributing torque between the plurality of output portions may comprise a second releasable torque transmitting means having an input portion and an output portion.

Optionally an input portion of the second releasable torque transmitting means is coupled to the ring gear.

Further optionally an output portion of the second releasable torque transmitting means is coupled to the second output of the differential.

Optionally an input portion of the second releasable torque transmitting means is coupled to the cage of the differential.

Further optionally an output portion of the second releasable torque transmitting means is coupled to an output of the differential.

In an embodiment the second releasable torque transmitting means comprises friction clutch means.

The clutch means may comprise a wet friction clutch device.

Optionally the means for asymmetrically distributing torque between the plurality of output portions of the drive means is provided on one side of the ring gear and the first releasable torque transmitting means is provided on the other side of the ring gear.

In an embodiment the drive means comprises the means for asymmetrically distributing torque between the plurality of output portions of the drive means.

This feature allows the means for asymmetrically distributing torque to be packaged with the drive means and may allow a reduction in overall package space required.

In an embodiment the drive means may be provided in a drive means housing.

This feature has the advantage that a common housing may be provided for the first releasable torque transmitting means and the means for asymmetrically distributing torque. The differential may also be provided within the drive means housing.

In an embodiment the vehicle may further comprise a power transfer unit (PTU) operable releasably to connect the prime mover means to the auxiliary drive shaft, the driveline being operable when in the first mode to allow the auxiliary drive shaft to come to rest when the prime mover means is driving the first group of wheels.

In an embodiment the PTU may be integrated into a housing of a transmission of the vehicle.

This feature has the advantage that an amount of package space required may be reduced in some embodiments.

In an embodiment the PTU may be arranged to be actuated by actuator means powered by a power supply of the transmission, optionally the power supply being arranged to provide one selected from amongst pressurized hydraulic fluid and electrical current.

Optionally the prime mover means comprises first and second prime movers.

Further optionally the first prime mover is arranged to drive the first group of one or more wheels and the second prime mover is arranged to drive the second group of one or more wheels, the PTU being operable to connect the second group of one or more wheels to the second prime mover.

Alternatively or in addition the PTU may be operable to connect the second group of one or more wheels to the first prime mover.

The first prime mover may be further operable to drive the second group of one or more wheels.

The second prime mover may be further operable to drive the first group of one or more wheels.

The vehicle advantageously has a power transfer unit operable releasably to connect the prime mover means to the auxiliary drive shaft, the driveline being operable when in the first mode to allow the auxiliary drive shaft to come to rest when the prime mover means is driving the first group of wheels.

In an embodiment the drive means further comprises a ring gear arranged to be driven by the auxiliary driveshaft, the drive means being operable to bring the ring gear to rest when the driveline is in the first mode of operation.

This feature has the advantage that losses associated with rotation of the ring gear may be substantially eliminated when the driveline is in the first mode of operation.

In an embodiment the drive means is provided in a drive means housing.

Optionally the releasable torque transmitting means is operable to select a proportion of the torque applied to the input portion that is transmitted to the output portions to be one of a substantially continuous range of values between the first and second values.

In an embodiment the first value corresponds to substantially no torque transmitted between the input portion and the output portions and the second value corresponds to substantially 100% torque transfer between the input portion and the output portions.

In a further aspect of the invention there is provided a method of controlling a driveline of a motor vehicle comprising the steps of:
driving a first group of one or more wheels of the driveline in a first mode of operation of the driveline; and
coupling an auxiliary portion of the driveline to the second group of two or more wheels and driving the second group of two or more wheels in addition to the first group in a second mode of operation of the driveline,
the step of coupling the auxiliary portion to the second group of wheels comprising coupling an auxiliary driveshaft of the auxiliary driveline to the second group of wheels by means of a first releasable torque transmitting means and a differential, the releasable torque transmitting means having an input portion coupled to the auxiliary driveline and at least a plurality of output portions arranged to drive different respective wheels of the second group of two or more wheels, the differential being arranged to allow at least two wheels of the second group of wheels to rotate at different respective speeds, the method comprising applying torque to an input portion of the releasable torque transmitting means by means of the auxiliary driveshaft and controlling the releasable torque transmitting means to vary the proportion of the torque applied to the input portion that is transmitted to the output portions.

In an embodiment the method comprises the step of varying the proportion of torque transmitted by the releasable torque transmitting means to be one of a substantially continuous range of values between the first and third values including the second value.

Still further advantageously the first value corresponds to substantially no torque transmitted between the input portion and the output portions and the second value corresponds to substantially 100% torque transfer between the input portion and the output portions.

Optionally the releasable torque transmitting means comprises a single wet clutch.

In an embodiment the releasable torque transmitting means comprises a single multi-plate wet clutch.

In a still further aspect of the invention there is provided a method of driving a driveline of a motor vehicle comprising the steps of: driving a first group of one or more wheels by means of the driveline; coupling an auxiliary portion of the driveline to a second group of two or more wheels and driving the second group of wheels by means of the auxiliary portion, the step of coupling the auxiliary portion to the second group of wheels comprising coupling an auxiliary driveshaft of the auxiliary portion to the second group of wheels by means of a single releasable torque transmitting means and a differential, the releasable torque transmitting means having an input portion coupled to the auxiliary portion and at least a plurality of output portions arranged to drive different respective wheels of the second group of two or more wheels, the differential being arranged to allow at least two wheels of the second group of wheels to rotate at different respective speeds, the method comprising applying torque to an input portion of the releasable torque transmitting means by means of the auxiliary driveshaft and controlling the releasable torque transmitting means to vary the proportion of the torque applied to the input portion that is transmitted to the output portions between at least first, second and third values.

According to one aspect of the invention for which protection is sought there is provided an apparatus for a driveline of a motor vehicle, the apparatus being operable to transmit torque from an output of a transmission to an auxiliary driveshaft of a vehicle, the apparatus comprising: a torque input portion; a torque output portion; releasable synchronizer means for synchronizing a speed of rotation of the output portion with a speed of rotation of the input portion; and releasable drive torque transmitting means for releasably coupling the input portion and the output portion thereby to allow drive torque to be transmitted from the input portion to the output portion.

It is to be understood that in some arrangements the auxiliary driveshaft may be referred to as a prop shaft.

In one non-limiting embodiment, the apparatus comprises a Power Transfer Unit (PTU). It is to be understood that embodiments of the invention have the advantage that a speed of rotation of the input and output portions may be matched (by the synchronizer means) before the releasable drive torque transmitting means is closed and drive torque is transmitted from the input portion to the output portion.

Thus the speed of rotation of an auxiliary driveshaft (or propshaft) connected to the output portion of the PTU may be matched to a speed of rotation of the input portion of the PTU before the releasable drive torque coupling means couples the input and output portions together.

It is to be understood that the synchronizer means may not be capable of transmitting drive torque from the torque input portion to the torque output portion of the PTU. That is, an amount of torque that the synchronizer means is capable of transmitting may be less than that which is required to be transmitted to the auxiliary driveshaft. Thus the releasable drive torque coupling means is provided for coupling the input and output portion is so as to allow torque to be transmitted from the torque input portion to the torque output portion.

This feature enables a relatively simple design or releasable drive torque transmitting means to be employed such as an interference-type releasable drive torque transmitting means, for example a dog clutch arrangement. Such designs can tolerate a relatively small difference in speed between shafts that are to be coupled together when it is required to couple the shafts together. It also allows a more compact PTU to be fabricated in some embodiments. This is because in some embodiments synchronizer means in combination with the releasable drive torque transmitting means may be made more compact than arrangements in which a single multiplate wet clutch is provided.

It is to be understood that in some arrangements the releasable torque transmitting means that it is desirable to use with the PTU may be incapable of coupling the input and output portions together if a difference in speed exists between them. This is because some clutches such as dog clutches or other non-slip clutches do not allow slip between input and output shafts when closed. Such clutches typically couple input and output shafts by interference rather than by friction. The use of a synchronizer means allows the speed difference to be reduced to zero or substantially zero in order to allow the releasable torque transmitting means to couple the input and output portions.

Furthermore, in some arrangements a risk that noise vibration and harshness (NVH) performance of a vehicle is compromised when the input and output portions are coupled together is reduced by the use of synchronizer means.

By way of example, synchronizer means in the form of a conventional friction cone synchronizer (such as a single cone synchronizer, dual cone synchronizer or multi-cone synchronizer) may be employed in combination with a non-slip interference-type coupling such as a dog clutch in an arrangement according to the present invention and be packaged in a smaller volume than a conventional multi-plate wet clutch of equivalent torque transmitting capacity.

It is to be understood that the synchronizer means is arranged to be releasable such that in the released condition the input and output portions of the releasable drive torque transmitting means are able to rotate at different respective speeds.

In an embodiment the drive torque transmitting means is arranged to be coupled in parallel with the synchronizer means. Thus in some embodiments the synchronizer means is not required to transmit substantially any torque therethrough when the drive torque transmitting means is engaged, and transmitting torque from the input portion to the output portion.

The synchronizer means may comprise a first surface arranged to rotate with the input portion and a second surface arranged to rotate with the output portion, the apparatus being operable releasably to urge the first and second surfaces towards one another thereby to transmit torque therebetween to synchronize the speed of rotation of the input and output portions.

Optionally one or more intermediate elements are arranged to be trapped between the first and second surfaces when the first and second surfaces are urged towards one another thereby to transmit torque between the input portion and the output portion.

The first and second surfaces may have complementary conical or frusto-conical portions. In the case where one or more intermediate elements are arranged to be trapped between the first and second surfaces, the one or more intermediate elements may be of corresponding conical or frusto-conical form.

In some embodiments the synchronizer may be of a single cone, dual cone or multi-cone type.

The releasable torque transmitting means may comprise a first portion arranged to rotate with the input portion and a second portion arranged to rotate with the output portion, the apparatus being operable to couple the input and output portions together thereby to prevent relative rotation.

The first and second portions may have complementary inter-engaging formations whereby the first and second portions may be coupled together to allow drive torque to be transmitted therebetween by interference.

The first and second portions may be arranged to be coupled directly to one another by physical contact therebetween.

Advantageously the first and second portions may be arranged to be coupled together by means of a coupling member.

The coupling member may comprise one selected from amongst a sleeve, a collar or a ring.

In an embodiment the coupling member is slidable axially thereby to couple the first and second portions.

In an embodiment the coupling member is arranged to be decoupled from the input portion when the input and output portions are not connected together by the coupling member.

This feature has the advantage that frictional losses due to rotation of the output portion with respect to the coupling member are not incurred if the output member is stationary whilst the vehicle is moving. In some embodiments the output member may be coupled to an auxiliary driveshaft which may be brought to rest when the driveshaft is not required to provide drive torque. For example the driveshaft may be decoupled from a transmission of a vehicle by means of the PTU and from rear wheels of a vehicle by means of a rear drive unit (RDU).

In some embodiments the first and second portions may be provided with formations that are complementary to corresponding formations of the coupling member thereby to allow coupling between the first and second portions and the coupling member, in the manner of a conventional dog clutch.

Optionally the complementary interengaging formations of the portions are provided respectively by a protrusion and a recess.

The complementary interengaging formations may be provided at least in part by toothed elements, which may be referred to as 'dogs'.

It is to be understood that advantageously the releasable drive torque transmitting means comprises a dog clutch.

In a further aspect of the invention for which protection is sought there is provided a vehicle comprising: prime mover means; at least first and second groups of one or more wheels; and a driveline to connect the prime mover means to the first and second groups of one or more wheels such that the first group of one or more wheels is driven by the prime mover means when the driveline is in a first mode of operation and the second group of one or more wheels is additionally driven by the prime mover means when the driveline is in a second mode of operation, the driveline including an auxiliary driveline comprising releasable torque transmitting means operable to connect the second group of one or more wheels to the prime mover means when the driveline transitions between the first mode and the second mode, the releasable torque transmitting means comprising a PTU according to the preceding aspect.

The auxiliary driveline may comprise an auxiliary driveshaft, the PTU being arranged to couple the auxiliary driveshaft to the prime mover means. As noted above the auxiliary driveshaft may also be referred to as a propshaft in some embodiments.

In an embodiment the releasable torque transmitting means further comprises a drive unit provided downstream of the PTU, the drive unit being operable to disconnect the auxiliary driveshaft from the second group of one or more wheels.

The drive unit may comprise clutch means operable to disconnect the auxiliary driveshaft from the second group of one or more wheels.

The vehicle may comprise a transmission having output means arranged to transmit torque from at least a portion of the prime mover means to the first group of one or more wheels, wherein the torque input portion of the PTU is coupled to the output means of the transmission.

Optionally at least a portion of the PTU is integrated into the transmission.

Further optionally substantially the whole of the PTU is integrated into the transmission.

It is to be understood that by integrating at least a portion of the PTU into the transmission, it may be possible for a manufacturer to employ one or more driveline components used in conventional vehicles not having a PTU, for example in permanent four wheel or all wheel drive vehicles. In some arrangements a common ring gear package may be employed to drivably connect the prop shaft to the transmission in both conventional vehicles and vehicles according to embodiments of the present invention having a PTU integrated into the transmission. A common connector shaft between the ring gear package and transmission may be used in some arrangements.

In some arrangements a position of an output shaft of the PTU may be substantially the same as that of an output shaft of a transmission not having an integrated PTU. The at least a portion of the PTU may be provided within a housing of the transmission.

The PTU may be integrated into the output means of the transmission.

The output means may for example comprise an output shaft.

Advantageously the PTU may be arranged to be actuated by actuator means powered by a power supply of the transmission.

The power supply may be arranged to provide one selected from amongst pressurized hydraulic fluid and electrical current to the actuator means thereby to power the actuator means.

In a further aspect of the invention for which protection is sought there is provided a method of coupling a first group of one or more wheels of a motor vehicle to a second group of one or more wheels of a motor vehicle by means of a power transfer unit (PTU) comprising the steps of: synchronizing by means of synchronizer means a speed of rotation of an input portion of the PTU with an output portion of the PTU; subsequently, releasably coupling the input portion and the output portion in parallel with the synchronizer portion by means of drive torque coupling means thereby to allow drive torque to be transmitted from the input portion to the output portion.

The method may comprise the step of releasably coupling the input portion and the output portion in parallel with the synchronizer portion by means of drive torque coupling means, the step comprising releasably coupling the input portion and the output portion in parallel by means of a dog clutch.

Within the scope of this application it is envisaged that the various aspects, embodiments, examples and alternatives, and particularly the individual features thereof, set out in the preceding paragraphs, in the claims and/or in the following description and drawings may be taken independently or in any combination thereof. For example, features described with reference to one embodiment are applicable to all embodiments, except where such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
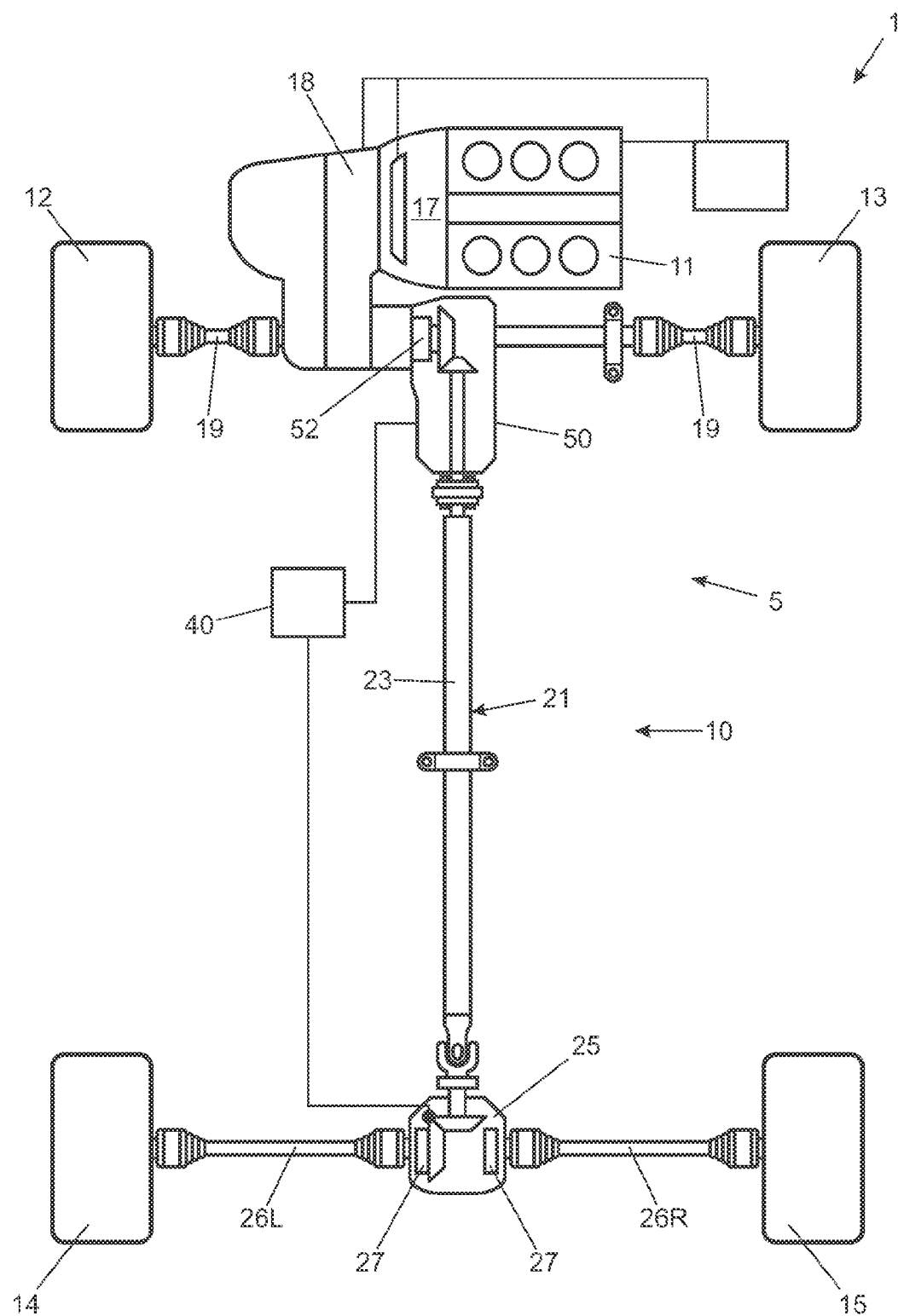
FIG. 1 is a schematic illustration of a vehicle having a known rear drive unit (RDU) having a differential and first and second differential clutches.

FIG. 1 shows a driveline 5 of a known motor vehicle 1. The driveline 5 is connected to an internal combustion engine 11 by means of a clutch 17 and gear box or transmission 18 and has a pair of front wheels 12, 13, an auxiliary driveline 10 and a pair of rear wheels 14, 15. The auxiliary driveline 10 may also be described as an auxiliary portion 10 of the driveline 5 since it forms part of the driveline 5.

The driveline 5 is arranged selectively to transmit power supplied to it by the gearbox 18 from the internal combustion engine 11 to the front wheels 12, 13 only (in a first mode of operation also referred to as a two wheel drive mode of operation) or to the front wheels 12, 13 and the rear wheels 14, 15 simultaneously (in a second mode of operation also referred to as a four wheel drive mode of operation).

Power is transmitted from the gear box 18 to the front wheels 12, 13 by means of a pair of front drive shafts 19.

Power is transmitted to the rear wheels 14, 15 by means of the auxiliary driveline 10. The auxiliary driveline 10 has a power transfer unit (PTU) 50 having releasable torque transmitting means in the form of a power transfer clutch (PTC) 52 operable to connect a drive shaft 23 of the auxiliary driveline 10 to the gearbox 18. The driveshaft 23 may be referred to as an auxiliary driveshaft in some arrangements since it is part of the auxiliary driveline. Alternatively is may be referred to as a main driveshaft. It may also be referred to as a propshaft. The PTC 52 is in the form of a multi-plate wet clutch (MPC).

The auxiliary drive shaft 23 is coupled in turn to a rear drive unit (RDU) 25 operable to couple the auxiliary drive shaft 23 to left and right rear drive shafts 26L, 26R respectively. The RDU 25 also has releasable torque transmitting means in the form of a pair of clutches 27. The RDU 25 is thereby operable to connect the auxiliary draft shaft 23 to the rear drive shafts 26L, 26R when the four wheel drive mode of operation is required. It is to be understood that differential rates of rotation of the respective rear drive shafts 26L, 26R may be accommodated by slip of the clutches 27.

The driveline 5 has a controller 40 arranged to control operation of the PTU 50 and clutches 27. When a four wheel drive mode of operation is required the controller 40 is arranged to close the PTC 52 and to close clutches 27 of the RDU 25.

Figure 2:
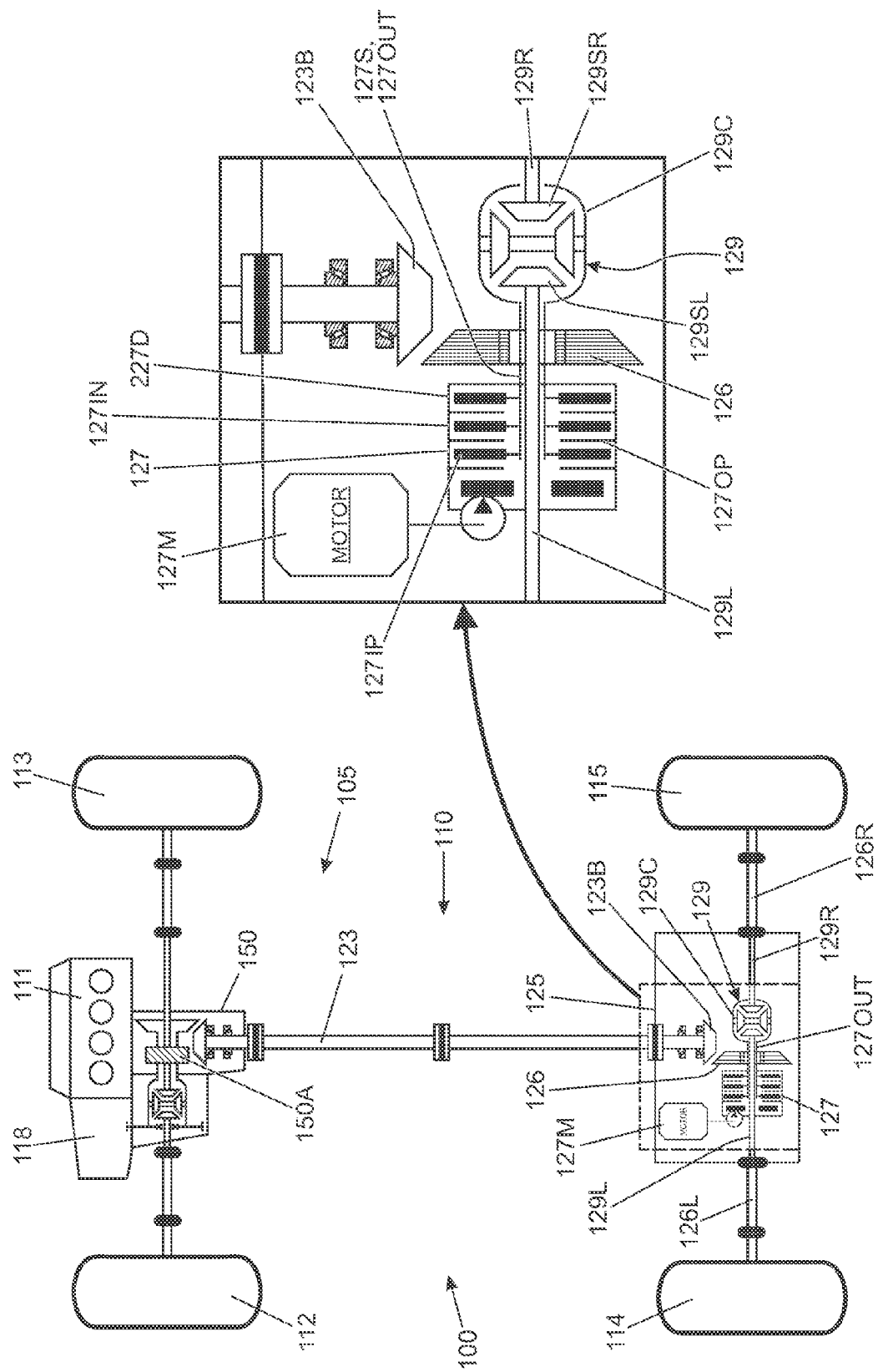
FIG. 2 is a schematic illustration of a vehicle having an RDU according to one embodiment of the invention.

FIG. 2 shows a portion of a vehicle 100 having a driveline 105 according to an embodiment of the present invention. Like features of the vehicle 100 of FIG. 2 to that of the vehicle of FIG. 1 are labelled with like reference numerals incremented by 100.

The vehicle has a rear drive unit (RDU) 125 having a multi-plate wet clutch (MPC) 127 coupled in series with a differential 129. The MPC 127 is operable between open and closed conditions by means of an actuator motor 127M.

The MPC 127 has an input portion 127IN that is driven by a ring gear 126 which is in turn driven by a bevel gear 123B fixedly coupled to the auxiliary driveshaft 123 and arranged to rotate therewith. The input portion 127IN of the MPC 127 is provided by a clutch drum 127D which drives an outer plate carrier 127OP. The output portion 127OUT is provided by an inner plate carrier 127IP having a shaft which also provides an output shaft 127S of the MPC 127. In some arrangements a separate output shaft 127S is provided.

The output shaft 127S is arranged to drive a cage 129C of the differential 129. The cage 129C is arranged to drive left and right output shafts 129L, 129R of the differential 129 via left and right side gears 129SL, 129SR in the conventional manner. The left and right output shafts 129L, 129R are coupled to left and right rear drive shafts 126L, 126R of the auxiliary driveline 110 respectively.

The left and right rear drive shafts 126L, 126R in turn drive left and right rear wheels 114, 115.

The auxiliary driveline 110 also has a power transfer unit (PTU) 150 by means of which the auxiliary driveshaft 123 may be releasably coupled to a transmission 118 of the vehicle 100.

In use, when it is required to drive only the front wheels 112, 113 of the vehicle 100 (in the first mode of operation of the driveline) the PTU 150 is arranged to disconnect the auxiliary driveline 110 from the transmission 118. Similarly, the RDU 125 is also controlled to open the MPC 127 to disconnect the rear wheels 114, 115 from the auxiliary driveshaft 123.

This allows the auxiliary driveshaft 123 to come to rest and has the advantage of reducing spin-losses when the vehicle is operating in the first mode. It is to be understood that in the embodiment of FIG. 2 (and the embodiments of FIG. 3 to FIG. 6, described below) the ring gear 126 is brought to rest when the PTU 150 and RDU 125 isolate the auxiliary driveshaft 123 from the transmission 118 and rear wheels 114, 115 respectively.

When the driveline is required to assume the four wheel drive (or 'second') mode of operation when it is in the two wheel drive (or 'first') mode, there are at least two possible sequences of operation of the PTU 150 and RDU 125 in order to drivably connect the rear wheels 114, 115 to the transmission 118.

In one sequence, the MPC 127 of the RDU 125 is closed by means of actuator 127M in order to accelerate the auxiliary driveshaft 123 from rest to a speed corresponding to that of the rear drive shafts 126L, 126R. Subsequently, the PTU 150 is closed in order to connect the auxiliary driveline 110 to the transmission 118 and deliver drive torque to the rear wheels 114, 115.

In an alternative sequence, the PTU 150 is closed first in order to accelerate the auxiliary driveshaft 123 to a speed corresponding to that of the output of the transmission 118. Subsequently the MPC 127 is closed to drivably connect the rear drive shafts 126L, 126R to the auxiliary driveshaft 123 in order to deliver drive torque to the rear wheels 114, 115.

In an alternative sequence the PTU 150 and RDU 125 may be controlled to accelerate the auxiliary driveshaft 123 substantially simultaneously.

It is to be understood that the arrangement of FIG. 2 provides a driveline disconnect system in which the auxiliary driveshaft 123 may be brought to rest when the driveline is in the first mode of operation. The arrangement of the RDU 125 allows the auxiliary driveshaft 123 to be disconnected from both of the rear drive shafts 126L, 126R by means of a single MPC 127 and a single actuator 127M.

Furthermore, the arrangement of FIG. 2 allows a modular driveline system to be provided allowing a driveline with or without the MPC 127 to be produced using similar ring gear and differential arrangements. Thus in some embodiments substantially the same or similar ring gear and differential components may be employed whether or not MPC 127 is provided, simplifying manufacture of vehicles with and without driveline disconnect functionality and with or without propshaft isolation functionality. By propshaft isolation functionality is meant an ability to isolate the propshaft from the front and rear wheels such that the propshaft may be brought to rest when the driveline is in the two wheel drive mode.

Thus, a version of a vehicle may be produced without the MPC 127 (in which case the auxiliary driveshaft 123 is driven permanently by the rear wheels 114, 115) or with the MPC 127 (in which case the auxiliary driveshaft 123 may be disconnected from the rear wheels 114, 115 as described above) by attaching the MPC 127 to the ring gear.

In the arrangement of FIG. 2 the MPC 127 and differential 129 are shown on opposite sides of the ring gear 126. It is to be understood that other arrangements are also useful. For example, the MPC 127 and differential 129 may both be provided on one side of the ring gear 126, i.e. to the left side or the right side. Alternatively the MPC 127 may be provided on the right side and the differential provided on the left side, the opposite to the arrangement of FIG. 2. Other arrangements may also be useful.

Figure 3:
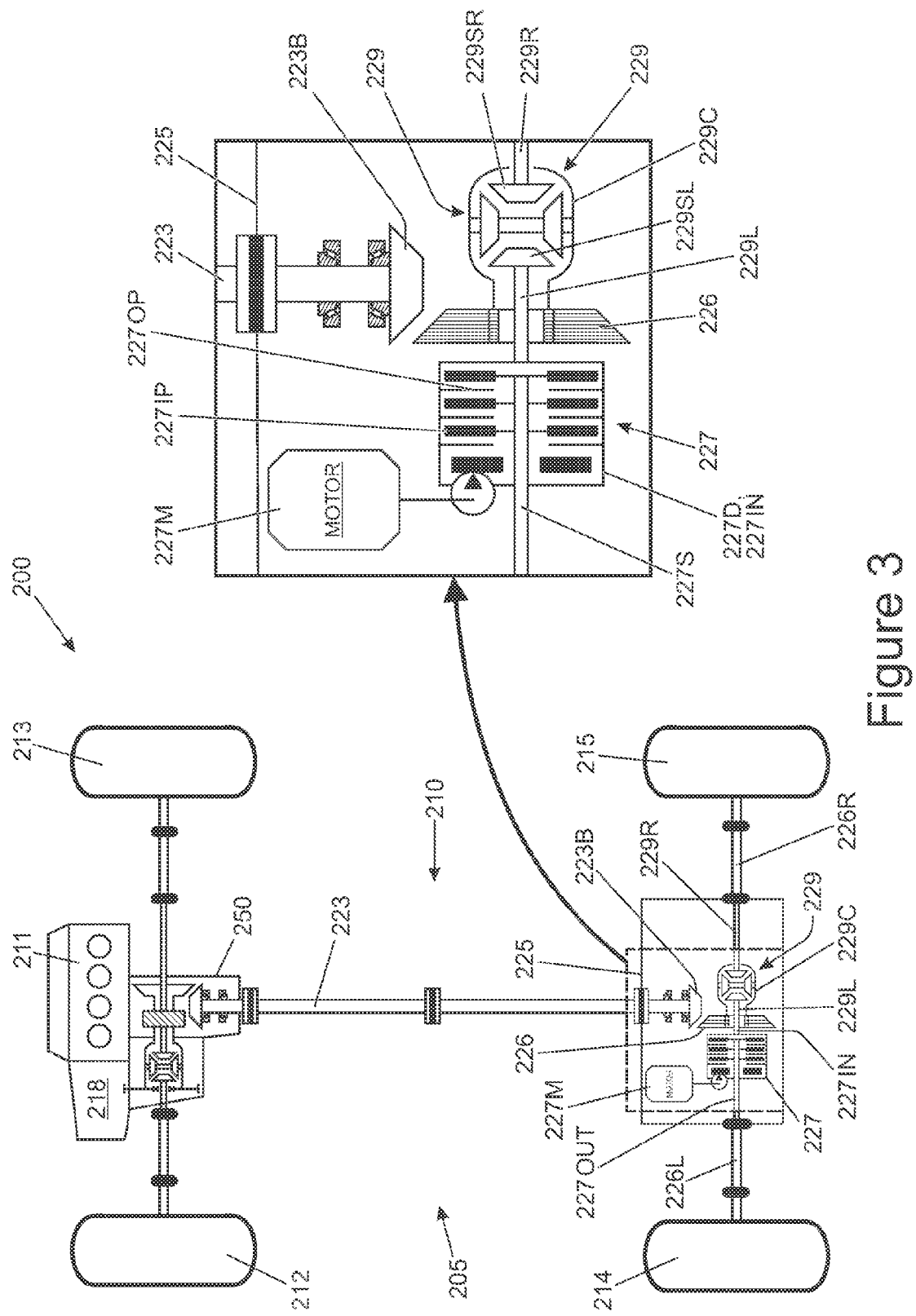
FIG. 3 is a schematic illustration of a vehicle having an RDU according to a further embodiment of the invention.

FIG. 3 shows a vehicle 200 according to a further embodiment of the invention. Like features of the vehicle 200 of FIG. 3 to that of the vehicle of FIG. 2 are labelled with like reference numerals incremented by 100.

The RDU 225 of the vehicle 200 is provided with a ring gear 226 driven by a bevel gear 223B which is in turn driven by the auxiliary driveshaft 223 in a similar manner to the embodiment of FIG. 2. However, rather than drive a MPC 227 directly, the ring gear 226 is arranged to drive a cage 229C of a differential 229. The differential 229 has left and right output shafts 229L, 229R respectively driven by the cage 229C via left and right side gears 229SL, 229SR in the conventional manner.

The right output shaft 229R is arranged to drive a right rear drive shaft 226R which drives a right rear wheel 215 whilst the left output shaft 229L is arranged to drive an input portion 227IN of the MPC 227. As in the embodiment of FIG. 2 the input portion 227IN is in the form of an outer clutch drum 227D which drives an outer plate carrier 227OP.

An output portion 227OUT of the MPC 227 is provided by an inner plate carrier 227IP having an output shaft 227S which is arranged to drive a left rear drive shaft 226L which is arranged in turn to drive a left rear wheel 214. In some embodiments the output shaft 227S may be coupled to a shaft of the inner plate carrier 227IP.

The MPC 227 is controlled by means of an actuator motor 227M to open or close thereby to allow torque to be transmitted from the input portion 227IN to the output shaft 227S when the MPC 227 is closed.

Other arrangements are also useful.

It is to be understood that the RDU 225 of the embodiment of FIG. 3 may also be readily adapted to modular design. For example, the arrangement of FIG. 3 may be adapted to operate without the MPC 227 by removing the MPC 227 and coupling directly the left output shaft 229L of the differential 229 to the left rear drive shaft 226L.

Thus, a given vehicle design may be readily adapted for production with or without MPC 227 depending on a customer or other requirement.

The vehicle 200 of FIG. 3 is provided with a power transfer unit (PTU) 250 in a similar manner to the vehicle 100 of FIG. 2. The PTU 250 is operable releasably to connect the auxiliary driveshaft 223 to the transmission 218.

Thus, with the PTU 250 and RDU 225 both in an open or 'disconnected' condition, the auxiliary driveshaft 223 is disconnected from both the transmission 218 and the wheels 214, 215 allowing the auxiliary driveshaft 223 to come to rest. This reduces parasitic losses associated with operation of the vehicle 200 in the first mode.

It is to be understood that in some embodiments the MPC 227 may be connected to the differential output shaft 229L and left rear drive shaft 226L such that the clutch drum 227D is connected to the left rear drive shaft 226L and the inner plate carrier 227IP is connected to the differential output shaft 229L. This feature has the advantage that when the MPC 227 is in the open condition and the vehicle 200 is moving the outer plate carrier 227OP will rotate. Rotation of the outer plate carrier 227OP causes fluid in the MPC 227 between clutch plates of the inner and outer plate carriers 227IP, 227OP to be displaced outwardly from between the plates. This has the effect of reducing an amount of drag on the outer plate carrier 227OP and therefore energy losses associated with the MPC 227. In some embodiments a valve or orifice may be provided to allow fluid between the plates 227CP, 227PP to pass into a collection volume ready for re-introduction to the volume between the plates when required. Other arrangements are also useful.

Figure 4:
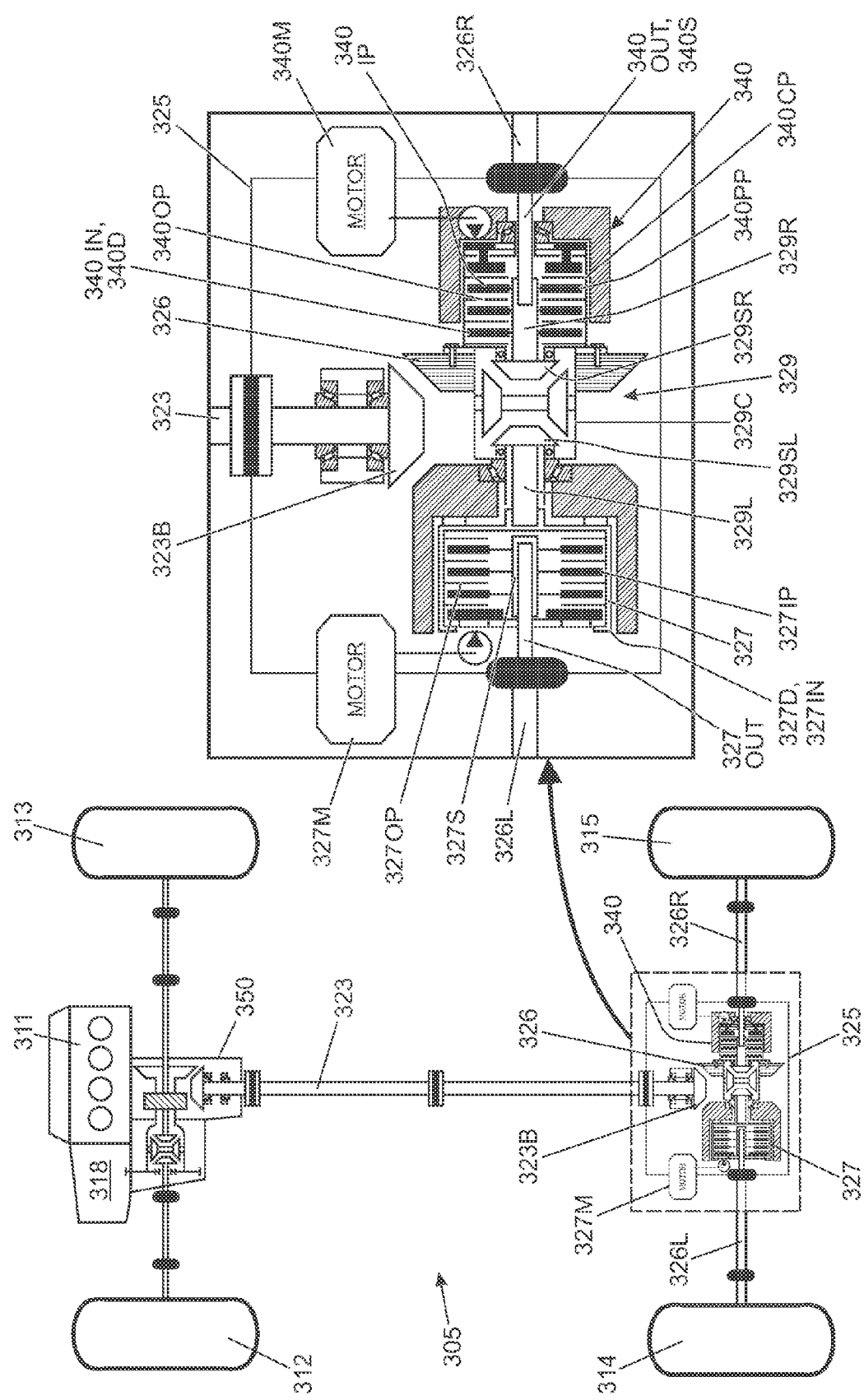
FIG. 4 is a schematic illustration of a vehicle having an RDU according to a still further embodiment of the invention.

FIG. 4 shows an RDU 325 according to a further embodiment of the invention. Like features of the embodiment of FIG. 4 to those of the embodiment of FIG. 3 are provided with like reference signs prefixed numeral 4 instead of numeral 3. The embodiment of FIG. 4 functions in a similar manner to the embodiment of FIG. 3 except that in the embodiment of FIG. 4 a second clutch device 340 is provided for providing "cross-axle lock" functionality as will be discussed in more detail below.

In the embodiment of FIG. 4 the second clutch device 340 is also a multi-plate wet clutch. The clutch 340 allows the RDU 325 to asymmetrically distribute torque between the left and right rear drive shafts 226L, 226R. This allows the RDU 325 to reduce a risk of wheel slip as described below. The second clutch 340 may be referred to as a 'locking' clutch in some embodiments because it serves to reduce relative rotation between the rear drive shafts 226L, 226R due to wheel slip, effectively 'locking' the drive shafts together. The clutch 327 for connecting and disconnecting the drive shafts 226L, 226R from the driveshaft 323 may be referred to as a 'disconnect' clutch 327 or disconnect MPC 327.

In the embodiment of FIG. 4 disconnect MPC 327 is provided on an opposite side of RDU ring gear 326 to that on which MPC 227 is provided in the embodiment of FIG. 3. However it is to be understood that in some embodiments having a locking clutch device the disconnect clutch device and locking clutch device may be provided on respective opposite sides to those on which they are provided in the embodiment of FIG. 4.

In the embodiment of FIG. 4 the ring gear 326 of RDU 325 is arranged to drive a cage 329C of a differential 329. The differential 329 has left and right output shafts 329L, 329R respectively that are arranged to be driven by the cage 329C in the conventional manner.

The right output shaft 329R of the differential 329 is arranged to drive a right rear drive shaft 326R of the vehicle 100 which in turn drives a right rear wheel 315. The left output shaft 329L of the differential 329 is arranged to drive an input portion 327IN of the MPC 327. The input portion 327IN is provided by clutch drum 327D which drives an outer plate carrier 327OP of the MPC 327. An output portion 327OUT of the MPC 327 in the form of an inner plate carrier 327IP having a shaft 327S that is arranged to drive an output portion 327OUT of the MPC 327. The output portion in turn drives a left rear drive shaft 326L which is arranged in turn to drive a left rear wheel 314.

The MPC 327 is controlled by means of an actuator motor 327M to open or close thereby to allow torque to be transmitted from the input portion 327IN to the output shaft 327OUT when the MPC 327 is closed.

As noted above, the vehicle 300 of FIG. 4 is provided with cross-axle lock functionality. That is, torque applied to the left and right rear drive shafts 326L, 326R respectively may be applied in an asymmetric manner thereby to reduce a risk of slip of the left or right rear wheel 314, 315 with respect to the other.

This has the advantage that if the vehicle encounters a situation in which one of the wheels 314, 315 has a reduced amount of available traction with respect to the other wheel, an amount of torque applied to the respective drive shafts 326L, 326R may be controlled to prevent or reduce wheel slippage. Reduced traction of one wheel with respect to the other may occur for example when negotiating icy or waterlogged terrain.

In the embodiment of FIG. 4 the purpose of locking MPC 340 is to prevent or reduce relative rotation between ring gear 326 and right rear drive shaft 326R when the locking clutch 340 assumes a closed or partially closed condition. Motor 340M is employed to actuate the locking clutch 340 to assume the closed or partially closed condition as required.

As shown in FIG. 4 the right rear drive shaft 326R is fixedly connected to a right side shaft 329R of the differential 329 via an output portion 340OUT of the MPC 340, in the form of a shaft 340S. The right side shaft 329R is connected in turn to a right side gear 329SR of the differential 329. The right side shaft 329R also forms part of an inner plate carrier 340IP of the MPC 340.

The MPC 340 has an input portion 340IN in the form of a clutch drum 340D that is connected directly to the ring gear 326 and arranged to be driven thereby. The drum 340D is arranged to drive outer plate carrier 340OP of the MPC 340.

It is to be understood that the right output shaft 329R of the differential 329 (and thereby the right rear drive shaft 326R) may be prevented from rotating relative to the ring gear 326 when required by closing the locking clutch device 340, which is actuated by motor 340M.

Figure 5:
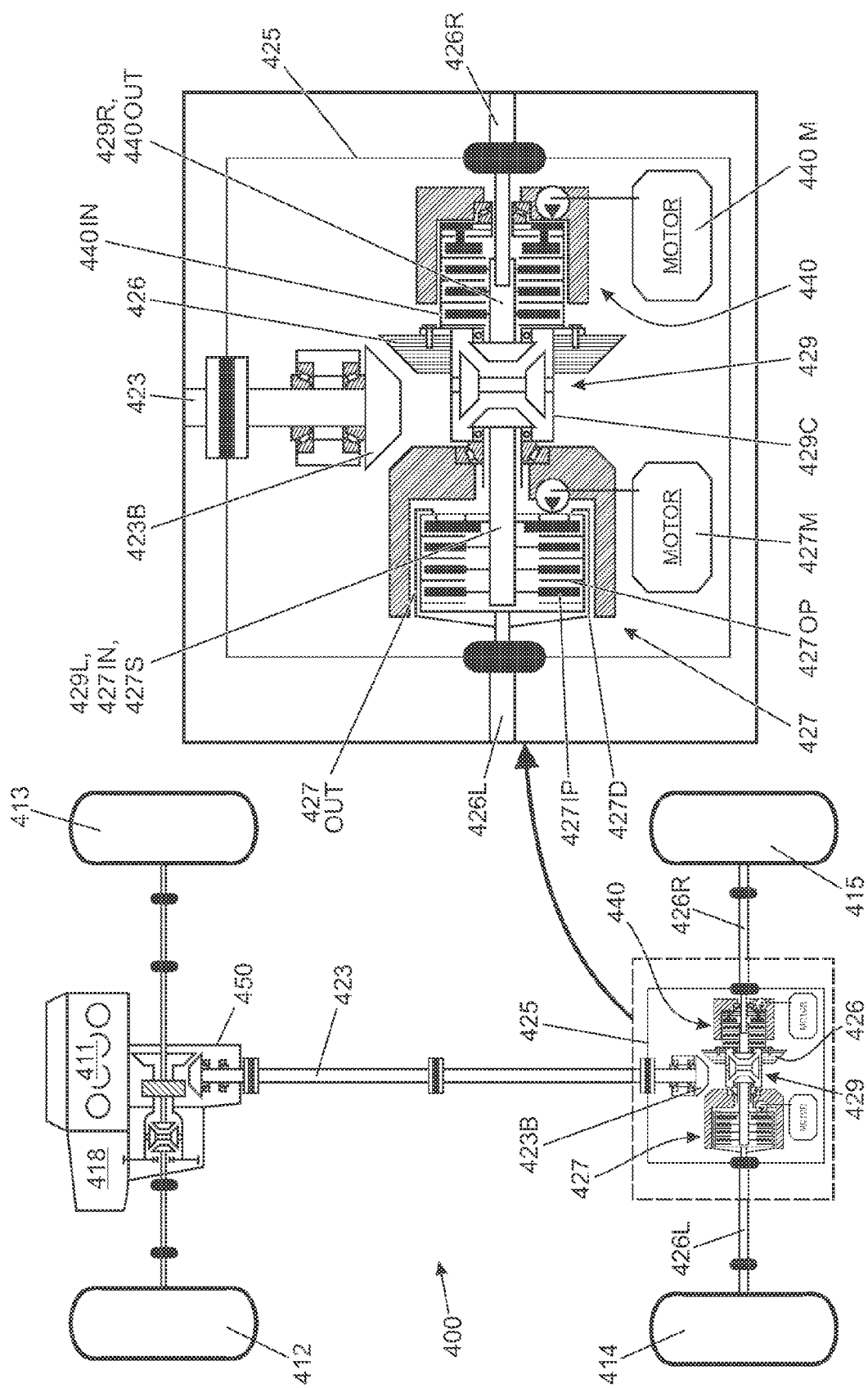
FIG. 5 is a schematic illustration of a vehicle having an RDU according to an embodiment of the invention.

FIG. 5 shows a vehicle 400 according to a further embodiment of the invention. Like features of the embodiment of FIG. 5 to those of the embodiment of FIG. 4 are provided with like reference signs prefixed numeral 4 instead of numeral 3.

The embodiment of FIG. 5 is substantially the same as the embodiment of FIG. 4 and functions in a similar manner. A principal difference between the embodiment of FIG. 5 and the embodiment of FIG. 4 is that in the embodiment of FIG. 5 a left output shaft 429L of the differential 429 is arranged to drive an input portion 427IN of MPC 427 in the form of an input shaft 427S which forms part of an inner plate carrier 427IP rather than clutch drum 427D as in the embodiment of FIG. 4. The output portion 427OUT of MPC 427 is provided by clutch drum 427D drivably connected to outer plate carrier 427OP. The drum 427D is arranged to drive left drive shaft 426L.

It is to be understood that this arrangement is the reverse of that of the embodiment of FIG. 4. In the arrangement of FIG. 5 outer plate carrier 427D is caused to rotate with left rear drive shaft 426L even when the clutch 427 is in the disconnected state, in which ring gear 426 is substantially stationary. This feature has the advantage that clutch fluid in the RDU 425 may be expelled by centrifugal forces from between clutch plates born by the inner and outer plate carriers 427S, 427D reducing rotational drag associated with the MPC 427. In some embodiments the disconnect clutch 427 is designed to allow fluid to be expelled beyond peripheral edges of clutch plates of the disconnect clutch 427. In some embodiments one or more valves, orifices and/or cavities may be provided into which fluid may pass in order no longer to be trapped between the clutch plates.

The RDU 425 of FIG. 5 is advantageous over that of FIG. 4 in that at least one less component is required in order to construct the RDU 425. It can be seen that in the embodiment of FIG. 5 the left output shaft 429L of the differential 429 forms part of inner plate carrier 427IP of the disconnect clutch 427.

In contrast, in the embodiment of FIG. 4 the left output shaft 329L of the differential 329 is connected to clutch drum 327D of the disconnect clutch 327. The shaft 327S of the inner plate carrier 327IP is connected to the left rear drive shaft 326L by means of a spline connection which is not required in the arrangement of FIG. 5.

However an advantage of the arrangement of FIG. 4 is that access to actuator motors 327M, 340M may be made more convenient than the arrangement of FIG. 5 because in the arrangement of FIG. 4 the motors 327M, 340M are at respective outer sides of the RDU 325.

Figure 6:
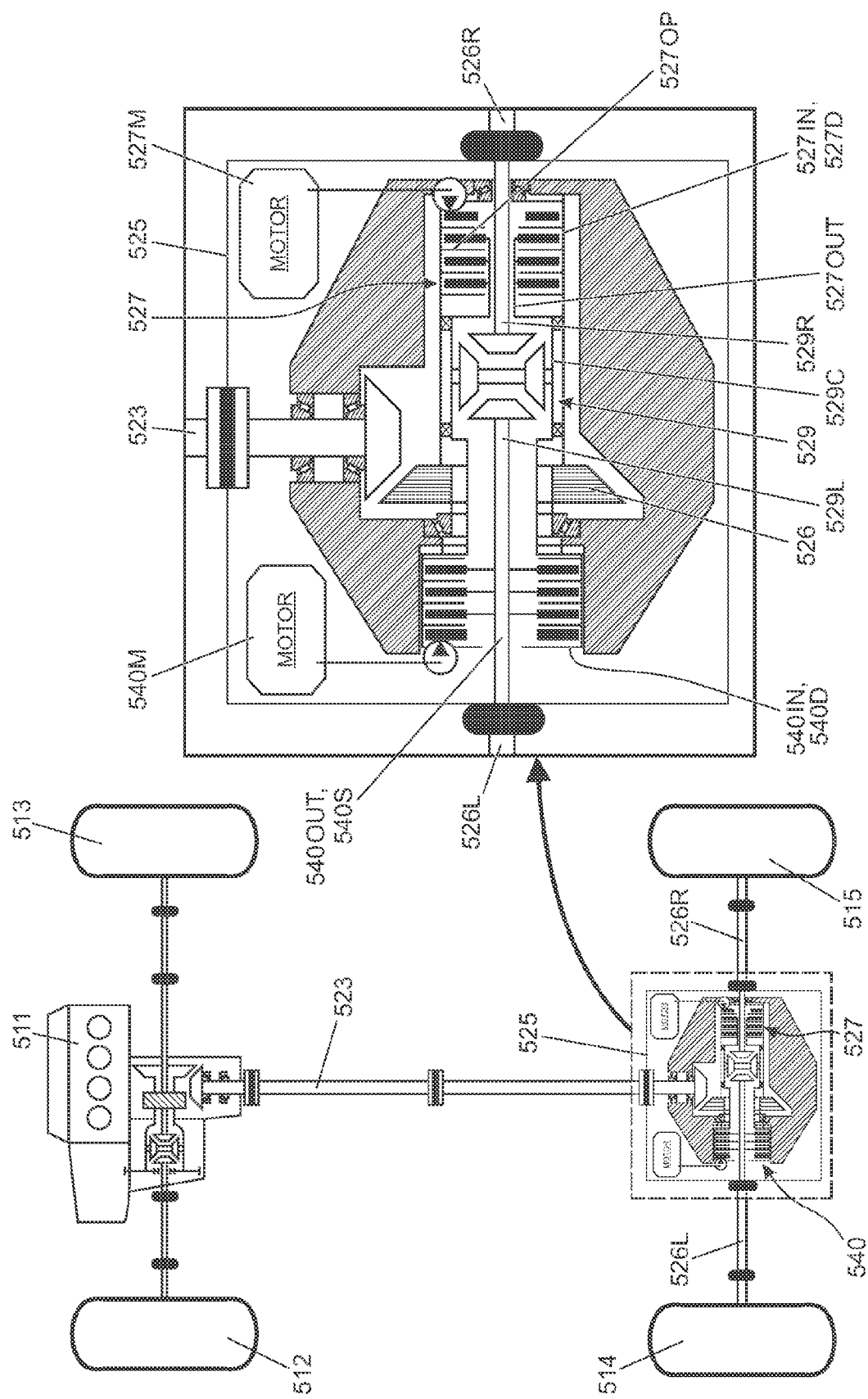
FIG. 6 is a schematic illustration of a vehicle having an RDU according to a further embodiment of the invention.

FIG. 6 shows an RDU 525 according to a further embodiment of the invention. Like features of the embodiment of FIG. 6 to those of the embodiment of FIG. 5 are shown with like reference signs incremented by 100.

The embodiment of FIG. 6 is similar to that of FIG. 2 in that a clutch drum 527D (providing an input portion 527IN) which drives an outer plate carrier 527OP of disconnect clutch 527 is connected substantially directly to ring gear 526. In the embodiment of FIG. 6 the disconnect clutch 527 is on the same side of the ring gear 526 as the differential 529 and is located between the differential 529 and right rear drive shaft 526R. A locking clutch 540 is provided on an opposite side of the ring gear 526. The locking clutch 540 facilitates asymmetric torque application to the left and right rear drive shafts 526L, 526R.

Inner plate carrier 527OUT of disconnect clutch 527 drives cage 529C of differential 529 which in turn drives an outer plate carrier 540IN of locking clutch 540. Inner plate carrier 540OUT of locking clutch 540 is connected to left output shaft 529L of differential 529 and left rear drive shaft 526L. Right output shaft 529R of differential 529 drives right rear drive shaft 526R.

The embodiment of FIG. 6 has the feature that actuator motors 540M, 527M of locking clutch 540 and disconnect clutch 527 are provided at respective outer left and right sides of the RDU 525, facilitating access during assembly and maintenance.

Figure 9:
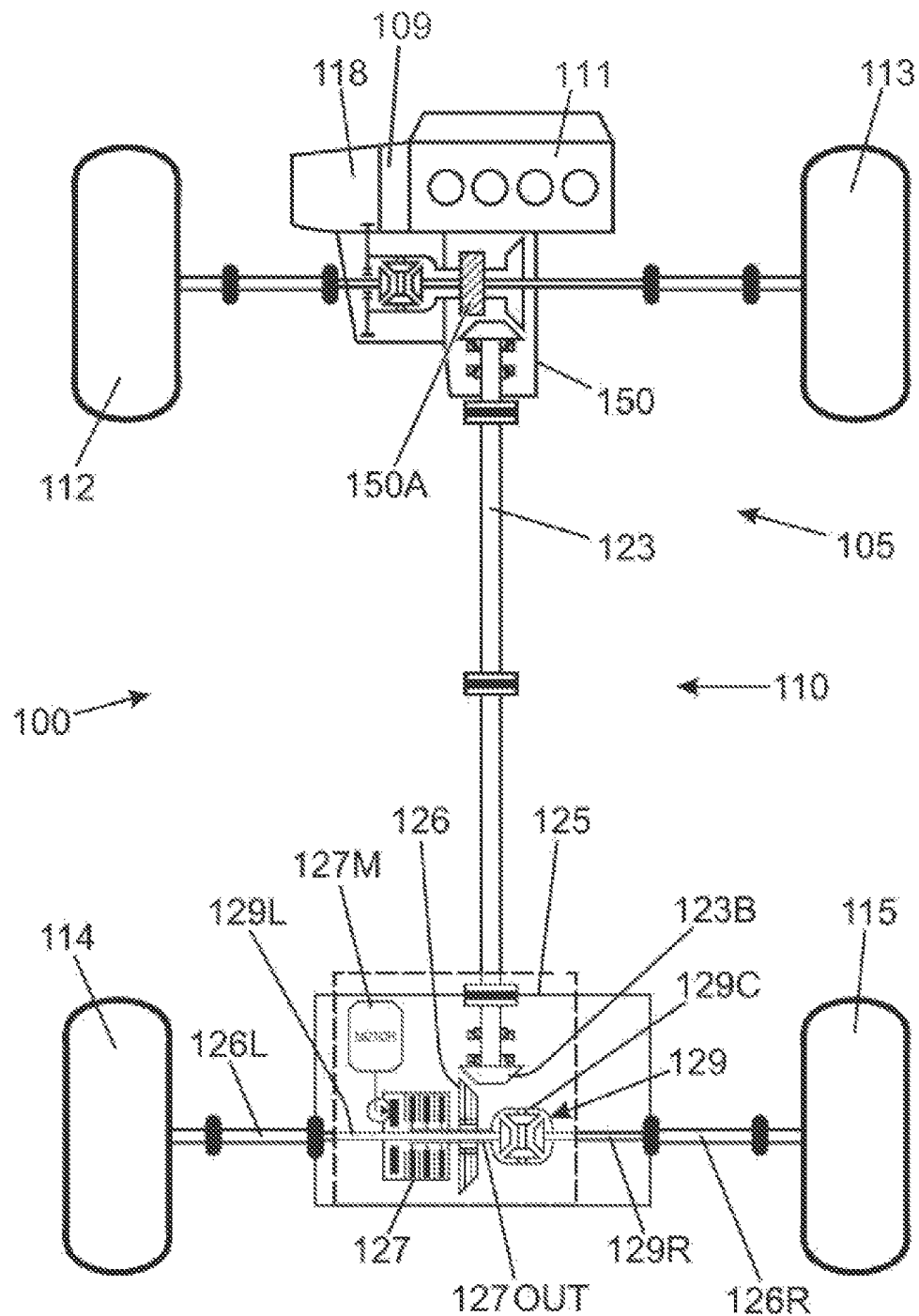
FIG. 9 is a schematic illustration of as vehicle having an RDU according to another embodiment of the invention.

In some embodiments of the invention, such as, for example, that shown in FIG. 9, the engine is a first prime mover and the vehicle including a second prime mover comprising one or more electric machines 109. The one or more electric machines 109 may be provided to provide drive torque to the driveline 105, 205 in addition to the engine 111, 211. In some arrangements the engine 111 and at least one electric machine 109 may be operated in parallel to drive the driveline in both the first and second modes of operation of the driveline.

In some embodiments the engine may be arranged to drive the front wheels only. Thus the at least one electric machine and not the engine may be arranged to drive the auxiliary driveline when the driveline is in the second mode of operation. In some embodiments no PTU is required. In some embodiments not having a PTU the electric machine is arranged to drive the auxiliary driveshaft 223 substantially directly.

Embodiments of the invention are also suitable for use with automatic transmissions or any other suitable transmission.

Power Transfer Unit

Referring back to FIG. 1, it is to be understood that employing a multi-plate wet clutch as the PTC 52 has the advantage that if a speed difference exists between input and output portions of the PTC 52, the speed difference may be accommodated by the PTC 52 and the speed of the auxiliary drive shaft 23 adjusted as the PTC 52 is closed. A speed difference may exist for example if the front wheels 12, 13 of the vehicle 100 are slipping due to loss of traction during acceleration or braking and the rear wheels 14, 15 are not. Thus there is a compelling reason for the use of a MPC as the PTC 52.

However, it is to be understood that packaging of wet clutches requires a not inconsiderable amount of space and it is desirable to reduce the size of the PTU 50. For example, in vehicles having an engine mounted in a transverse or 'east-west' orientation (as opposed to a longitudinal or 'north-south' orientation) the amount of space available to package the PTU 50 is particularly limited.

Figure 7:
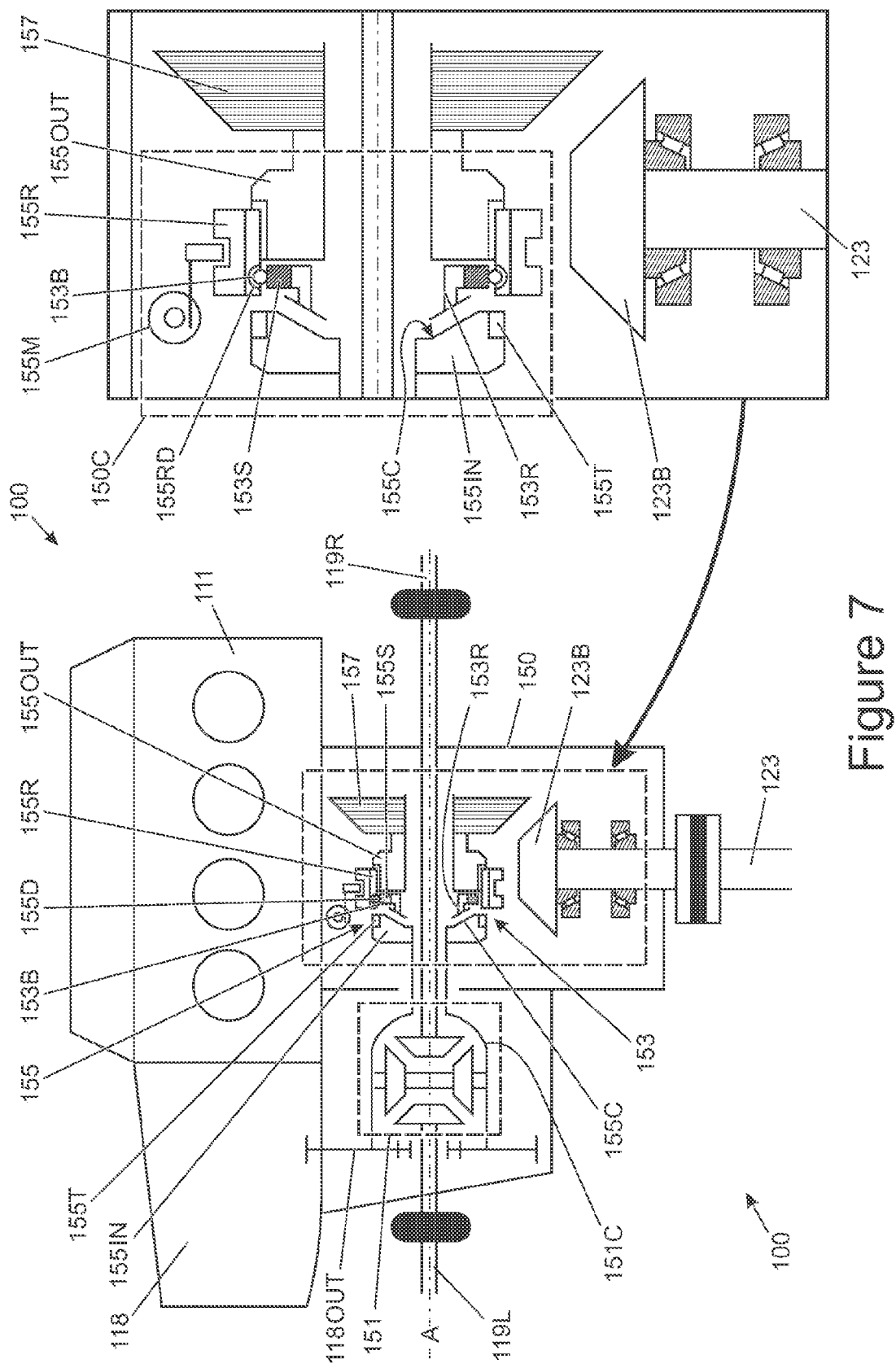
FIG. 7 is a schematic illustration of a power transfer unit (PTU) that may be used in connection with one or more of the embodiments of the invention.

FIG. 7 shows a portion of a vehicle 100 having a PTU 150 according to an embodiment of the present invention having a reduced package size compared to the known PTU 50 of the arrangement of FIG. 1. Like features of the vehicle 100 of FIG. 7 to that of the vehicle 1 of FIG. 1 are labelled with like reference numerals incremented by 100.

The PTU 150 has a differential portion 151 having a differential cage (or 'case') 151C arranged to be rotated by an output drive 118OUT of a gearbox 118. Drive shafts of the differential portion 151 are arranged to drive left and right front drive shafts 119L, 119R of the vehicle 100.

The differential cage 151C is also coupled to an input portion 155IN of a dog clutch 155 associated with a synchronizer device. The dog clutch 155 has an output portion 155OUT arranged to be coupled to the input portion 155IN. The output portion 155OUT is arranged to be coupled to the input portion 155IN by a ring or collar member 155R that encircles the output portion 155OUT and is slidable parallel to an axis of rotation A of the dog clutch 155. An actuator in the form of an electric motor 155M is operable to cause the ring member 155R to slide parallel to axis A.

The ring member 155R is arranged to rotate with the output portion 155OUT about axis A. In the position shown in FIG. 7 the ring member 155R is disengaged from the input portion 155IN of the dog clutch 155. This feature has the advantage that in arrangements in which the auxiliary driveshaft 123 may be brought to rest when disconnected from the transmission 118, losses associated with relative rotation of the input portion 155IN and collar member 155R will not occur when the driveshaft 123 is disconnected from the transmission 118.

The ring member 155R may be slid axially towards the input portion 155IN of the dog clutch 155 (by means of motor 155M) such that the ring member 155R engages a set of teeth 155T provided around a periphery of the input portion 155IN thereby coupling the input portion 155IN of the dog clutch 155 to the output portion. In this condition the input and output portions 155IN, 155OUT rotate at precisely the same speed, slip therebetween being prevented by interference. The PTU 150 may then be said to be in a 'connected' condition or state as opposed to a 'disconnected' condition or state. It is to be understood that since the dog clutch 155 is a substantially dry clutch, not allowing relative rotation between input and output shafts, losses associated with torque delivery from the engine 111 to the auxiliary driveshaft 123 are reduced relative to known PTUs in which a multiplate wet clutch is provided.

Similarly, when the PTU 150 is in the disconnected state and the input portion 155IN rotates whilst the auxiliary driveshaft 123 is stationary, the fact that the dog clutch 155 is a substantially dry clutch has the advantage that fluid losses due to the difference in rotational speeds of the input and output portions 155IN, 155OUT that would otherwise be incurred if a multiplate wet clutch was employed are not incurred.

The PTU 150 also has a synchronizer 153 integrated therewith. The synchronizer 153 has a conical ring element 153R having a frusto-conical form that is coupled to the ring member 155R of the dog clutch 155 and arranged to rotate therewith. The ring element 153R may also be referred to as a 'friction cone'.

The combination of dog clutch 155 and synchronizer 153 may be described as a PTU clutch package 150C. In some embodiments the PTU clutch package itself may be referred to as a 'synchronizer'.

The synchronizer 153 is arranged such that as the dog clutch ring member 155R is slid axially towards the input portion 155IN of the dog clutch 155 the conical ring element 153R of the synchronizer abuts a corresponding conical concave surface 155C of the dog clutch input portion 155IN, defining a cavity.

If the front wheels of the vehicle 100 are rotating, the input portion 155IN of the dog clutch 155 will also be rotating. Thus as the conical synchronizer ring element 153R comes into contact with the dog clutch input portion 155IN the conical ring element 153R will be caused to rotate also by frictional forces therebetween.

The amount of torque that may be transmitted between the input portion 155IN of the dog clutch 155 and the auxiliary drive shaft 123 by the synchronizer ring 153R alone is limited by the frictional force that may be developed between the conical surface 155C of the dog clutch input portion 155IN and the ring element 153R.

It is to be understood therefore that as the dog clutch ring member 155R is slid axially towards the dog clutch input portion 155IN it experiences rotational acceleration as the ring element 153R contacts the input portion 155IN until a speed of rotation of the ring element 153R substantially matches that of the input portion 155IN.

As the ring element 153R continues to slide it eventually engages the input portion 155IN 155 thereby completing engagement of the dog clutch 155 and 'closure' of the PTU 150.

In the arrangement of FIG. 7 the dog clutch ring member 155R is provided with a recessed portion 155RD around an inner peripheral surface thereof. The synchronizer ring element 153R supports a ball bearing 153B at a radially outer surface thereof. The ball bearing 153B is biased in a radially outward direction by a spring element 153S into abutment with the ring member 155R.

When the ring member 155R is not engaged with the input portion 155IN of the dog clutch 155 the ball bearing 153B locates within the recess portion 155RD of the ring member 155R. By means of this location of the ball bearing 153B, axial sliding of the ring member 155R causes a corresponding axial sliding of the ring element 153R.

However, if the force urging the dog clutch ring member 155R towards the input portion 155IN of the dog clutch 155 is sufficiently high, the ball bearing 153B is forced out of the recessed portion of the ring member 155RD and the ring member 155R slides beyond the ring element 153R to engage with the input portion 155IN.

It is to be understood that the force required to force the recessed portion 155RD beyond the ball bearing 155B is set to be sufficiently high that a force between the synchronizer ring element 153R and dog clutch input portion 155IN is sufficiently high to cause the dog clutch input and output portions 155IN, 155OUT to rotate at substantially the same speed. This allows the dog clutch 155 to be engaged with substantially no relative rotation between its input and output portions 155IN, 155OUT.

In some embodiments a plurality of ball bearings 153B are provided around the ring element 153R and arranged to locate within the recessed portion of the ring member 155RD when the dog clutch 155 is not closed.

The synchronizer 153 described above may be referred to as a 'single cone synchronizer' although other shapes of synchronizer ring element 153R are also useful other than frusto-conical shapes.

In some embodiments one or more further frusto-conical elements or 'friction cones' may be provided between the conical ring element 153R of the synchronizer 153 and the dog clutch input portion 155IN. The one or more further friction cone elements may be arranged to be trapped between the conical ring element 153R and the conical surface 155C of the dog clutch input portion 155IN thereby to transmit torque between the dog clutch input and output portions 155IN, 155OUT. In the case that one further friction cone is provided the synchronizer 153 may be referred to as a 'dual cone synchronizer'.

Other shapes of friction element are also useful.

Embodiments of the invention have the advantage that a speed of rotation of the auxiliary driveshaft 123 may be matched to that of the differential cage 151C (or gearbox 118) before the dog clutch 155 is engaged. This allows a dog clutch 155 to be employed in circumstances where it is desirable to connect the auxiliary driveline 110 to the gearbox 118 when a speed mismatch exits between the auxiliary driveshaft 123 and the gearbox 118. A speed mismatch may exist for example if the vehicle 100 is moving and the auxiliary driveshaft 123 is disconnected from rear wheels of the vehicle 100 and disconnected from the gearbox 118 by the PTU 150. A speed mismatch may also exist if the auxiliary driveshaft 123 is connected to the rear wheels of the vehicle 100 but front wheels of the vehicle are spinning faster than the rear wheels (for example due to slippage of the front wheels on a driving surface).

It is to be understood that dog clutches are typically not arranged to allow engagement thereof when an appreciable speed difference exists between input and output portions thereof. Thus if a dog clutch alone where used in the arrangement of FIG. 7, without the synchronizer 153, difficulty would be experienced connecting the auxiliary driveshaft 123 to the gearbox 118 if such a speed difference existed.

It is to be understood that in some situations it is desirable to employ a dog clutch 155 and not a plate-type clutch such as a multi-plate wet clutch (MPC) 52 as per the known arrangement of FIG. 1. This is because in some embodiments a synchronizer 153 in combination with a dog clutch 155 may be packaged in a smaller volume than an MPC 52.

Furthermore, parasitic losses associated with the use of a wet clutch in the PTU 150 may be substantially eliminated by use of a dog clutch 155 since a dog clutch 155 is arranged to allow substantially no slip between input and output portions 155IN, 155OUT thereof when closed, and may be arranged to operate 'dry' such that parasitic fluid losses experienced by a wet MPC 52 do not occur even when in an open (disconnected) condition.

It is to be understood that in some alternative embodiments, instead of a synchronizer having a conical ring element 153R, synchronizer means in the form of a pilot multi-plate wet clutch (PMPC) may be employed to synchronize the speed of rotation of the input and output portions 155IN, 155OUT of the dog clutch 155 before closing the dog clutch 155.

It is to be understood that a PMPC (like the synchronizer described above) is not normally designed to transfer sufficient torque to drive wheels of a vehicle. Rather, the PMPC is arranged to transfer sufficient torque to accelerate the auxiliary driveshaft 123 to a speed matching that of the input portion of the PMPC thereby to allow the dog clutch 155 to be closed, the dog clutch 155 being coupled in parallel with the PMPC.

It is to be understood that the PMPC in combination with a dog clutch 155 may be provided in a smaller package space than a corresponding MPC arranged to transfer drive torque from the gearbox 118 to the auxiliary driveline 110.

It is to be understood that other synchronizer means are also useful in addition to a dual cone synchronizer or a pilot multi-plate wet clutch. For example, a single cone synchronizer, a triple cone synchronizer or a synchronizer with any suitable number of friction cones may also be employed. Other types of synchronizer or other devices arranged to synchronize the speed of rotation of the input and output portions 155IN, 155OUT are also useful.

It is to be understood that the PTU 150 of the vehicle 100 of FIG. 7 may be employed in a vehicle having a differential 25 as per the vehicle of FIG. 1. The PTU 150 may also be employed in a vehicle having a rear drive unit (RDU) not having a differential but instead employing respective left and right clutches to allow differential rates of rotation of left and right half shafts (or drive shafts) driving respective left and right rear wheels.

Other arrangements are also useful.

Embodiments of the invention are also suitable for use with automatic transmissions or any other suitable transmission.

Figure 8:
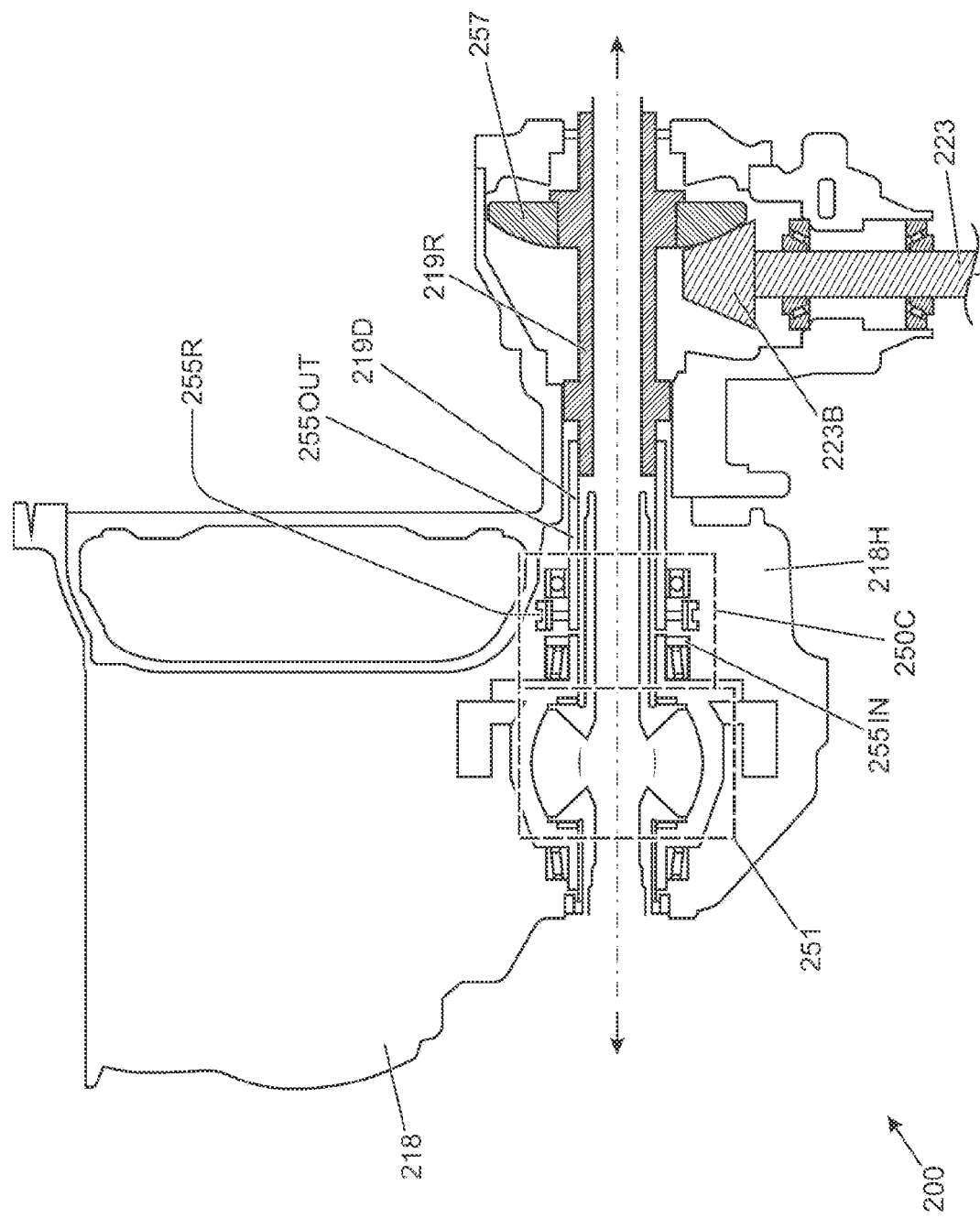
FIG. 8 is a schematic illustration of an alternative embodiment of a power transfer unit integrated into a transmission of a vehicle.

FIG. 8 shows a portion of a vehicle 200 according to a further embodiment of the invention. Like features of the embodiment of FIG. 8 to those of the embodiment of FIG. 7 are shown with like reference signs prefixed numeral 2 instead of numeral 1.

A gearbox 218 of the vehicle 200 has a differential 251 and a PTU clutch package 250C integrated therewith as shown in FIG. 8. In the embodiment shown the differential 251 and clutch package 250C are otherwise similar to those of the vehicle 100 of FIG. 7 and are located within a housing 218H of the transmission.

As shown in FIG. 8 an output of the gearbox 218 is provided by the output 255OUT of the PTU clutch package 250C. The output 255OUT is coupled to a right-hand drive shaft 219R of the vehicle 200 by means of a drive collar 219D.

The arrangement of FIG. 8 has the advantage that a more compact driveline arrangement may be implemented since the differential 251 and PTU clutch package 250C are integrated into the gearbox 218. Thus a reduction in package space may be enjoyed when a PTU clutch package according to an embodiment of the present invention is employed.

Furthermore, power to actuate the PTU clutch package 250C may be provided by a power supply of the transmission. This feature enables a further reduction in required packaging space in some embodiments. Thus in the case that the PTU clutch package 250C requires hydraulic power, a hydraulic line may be provided by the transmission. Alternatively or in addition, if an electrical power supply is required in order to actuate the PTU 250C this may be provided by the transmission in some embodiments. Similarly, a control signal to control actuation of the PTU 250C may be provided by a transmission controller in some embodiments.

In the embodiment of FIG. 8 the gearbox is an automatic gearbox 218. It is to be understood that the gearbox 218 may alternatively be a manual gearbox, a semi-automatic gearbox, an automated manual transmission, a continuously variable transmission, an infinitely variable transmission or any other suitable gearbox or transmission.

Other arrangements are also useful.

In the embodiments illustrated in the figures the engine is oriented in a transverse or 'east-west' orientation. In some alternative embodiments the engine may be oriented in a longitudinal or 'north-south' orientation.

In some embodiments the engine may be provided at a rearward location of the vehicle in a transverse, longitudinal or any other suitable orientation.

It is to be understood that in the embodiments of FIG. 7 and FIG. 8 the PTU is provided in a front portion of the motor vehicle and is operable to connect or disconnect the auxiliary drive shaft from the engine, the auxiliary drive shaft being arranged to drive the rear wheels of the vehicle.

In some alternative embodiments the PTU may be provided in a rearward portion of the vehicle or any other suitable location between the front and rear of the vehicle. For example the PTU may be provided in a rearward portion of a vehicle and arranged releasably to connect the auxiliary driveshaft to a rear-mounted transmission. Such an arrangement may be particularly useful in a vehicle having a rearward mounted engine.

Alternatively, as in the illustrated embodiments the PTU may be arranged to connect or disconnect the auxiliary driveshaft from the engine, the driveshaft being arranged to drive front wheels of the vehicle.

Other arrangements are also useful.

In some arrangements actuators of the PTU and RDU may be actuated by one or more electromechanical actuators. Alternatively or in addition one or more hydraulic actuators may be employed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle comprising:
a prime mover;
a first group of one or more wheels;

a second group of two or more wheels; and
a driveline to connect the prime mover via a transmission to the first and second groups of wheels such that the first group of one or more wheels may be driven by the prime mover when the driveline is in a first mode of operation and the second group of wheels may additionally be driven by the prime mover when the driveline is in a second mode of operation,
the driveline including an auxiliary driveline comprising an auxiliary driveshaft and drive means between the auxiliary driveshaft and the second group of wheels,
wherein the drive means comprises:
a ring gear arranged to be driven by the auxiliary driveshaft;
an input portion;
a plurality of output portions each operable to drive a respective different wheel of the second group of wheels;
a differential arranged to enable the respective output portions of the drive means to rotate at different respective speeds;
a first releasable torque transmitting means operable releasably to connect the input portion of the drive means to the output portions of the drive means thereby to allow the input portion of the drive means to drive the output portions of the drive means, wherein the first releasable torque transmitting means is operable to enable slippage of the input portion of the drive means with respect to the output portions of the drive means thereby to vary an amount of torque that is transmitted from the input portion of the drive means to the output portions of the drive means; and
wherein the first releasable torque transmitting means is operable to enable the output portions of the drive means to rotate independent of the rotation of the ring gear thereby to enable the ring gear to be brought to rest when the driveline is in the first mode of operation; and
a locking clutch operable releasably to connect a cage of the differential to an output portion of the drive means thereby to couple rotation of the cage of the differential to rotation of the output portion of the drive means,
wherein the locking clutch and the first releasable torque transmitting means are respectively provided on opposite sides of the ring gear.

2. The vehicle of claim 1 wherein the first releasable torque transmitting means comprises friction clutch means.

3. The vehicle of claim 1 wherein the output portions of the drive means are arranged to provide torque to each one of a pair of side shafts of the vehicle, the side shafts being arranged to provide torque to respective different wheels of the second group of wheels.

4. The vehicle of claim 1 wherein the input portion of the locking clutch is coupled to the cage of the differential.

5. The vehicle of claim 4 wherein the output portion of the locking clutch is coupled to an output of the differential.

6. The vehicle of claim 1 wherein the locking clutch comprises friction clutch means.

7. The vehicle of claim 1 wherein the driveline includes a power transfer unit (PTU) operable releasably to connect the prime mover to the auxiliary drive shaft, the driveline being operable when in the first mode to allow the auxiliary drive shaft to come to rest when the prime mover is driving the first group of wheels.

8. The vehicle of claim 7 wherein at least a portion of the PTU is integrated into a housing of the transmission of the vehicle.

9. The vehicle of claim 7 wherein the PTU is arranged to be actuated by actuator means powered by a power supply of the transmission, optionally the power supply being arranged to provide one selected from amongst pressurised hydraulic fluid and electrical current.

10. The vehicle of claim 1 wherein the prime mover comprises first and second prime movers.

11. A method of controlling a driveline of a motor vehicle comprising the steps of:
driving a first group of one or more wheels of the driveline in a first mode of operation of the driveline; and
coupling an auxiliary portion of the driveline to a second group of two or more wheels and driving the second group of two or more wheels in addition to the first group in a second mode of operation of the driveline,
the step of coupling the auxiliary portion to the second group of wheels comprising:
coupling an auxiliary driveshaft of the auxiliary portion of the driveline to the second group of wheels by means of a first releasable torque transmitting means and a differential, the first releasable torque transmitting means being arranged to releasably couple a ring gear to a plurality of output portions of a drive means of the auxiliary driveline each arranged to drive different respective wheels of the second group of two or more wheels, the differential being arranged to allow at least two wheels of the second group of wheels to rotate at different respective speeds, and whereby coupling the auxiliary driveshaft to the second wheel group causes the ring gear to be driven by the auxiliary driveshaft;
the method comprising applying torque to an input portion of the first releasable torque transmitting means via the auxiliary driveshaft and the ring gear and controlling the first releasable torque transmitting means to vary the proportion of the torque applied to the portion of the first releasable torque transmitting means that is transmitted across the first releasable torque transmitting means to the output portions of the drive means,
the method further comprising controlling a locking clutch, disposed on the opposite side of the ring gear to the first releasable torque transmitting means, to releasably couple rotation of a cage of the differential to rotation of the output portions of the drive means.

12. The method of claim 11 comprising the step of varying the proportion of torque transmitted by the first releasable torque transmitting means to be one of a substantially continuous range of values between first and second values.

13. The method of claim 12 wherein the first value corresponds to substantially no torque transmitted between the input portion of the first releasable torque transmitting means and the output portions of the drive means and the second value corresponds to substantially 100% torque transfer between the input portion of the first releasable torque transmitting means and the output portions of the drive means.

14. The method of claim 11 wherein the first releasable torque transmitting means comprises a single wet clutch or a single multi-plate wet clutch.

15. A vehicle comprising:
a first prime mover and a second prime mover wherein at least one of the first and second prime movers is an electric machine;
a first group of one or more wheels;
a second group of two or more wheels; and
a driveline to selectively connect each of the first and second prime movers via a transmission to the first and second groups of wheels such that the first group of one or more wheels may be driven by the connected one of the first and second prime movers when the driveline is in a first mode of operation and the second group of wheels may additionally be driven by the connected one of the first and second prime movers when the driveline is in a second mode of operation, the driveline including an auxiliary driveline comprising an auxiliary driveshaft and drive means between the auxiliary driveshaft and the second group of wheels, wherein the drive means comprises:

an input portion;

a plurality of output portions each operable to drive a respective different wheel of the second group of wheels;

a differential arranged to enable the respective output portions of the drive means to rotate at different respective speeds;

a first releasable torque transmitting means operable releasably to connect the input portion of the drive means to the output portions of the drive means thereby to allow the input portion of the drive means to drive the output portions of the drive means, wherein the first releasable torque transmitting means is operable to enable slippage of the input portion of the drive means with respect to the output portions of the drive means thereby to vary an amount of torque that is transmitted from the input portion of the drive means to the output portions of the drive means; and wherein the drive means comprises a ring gear arranged to be driven by the auxiliary driveshaft, the ring gear being coupled to an input portion of the first releasable torque transmitting means, an output of the first releasable torque transmitting means being operable to drive a cage of the differential, wherein the first releasable torque transmitting means is operable to enable the output portions of the drive means to rotate independent of the rotation of the ring gear thereby to enable the ring gear to be brought to rest when the driveline is in the first mode of operation; and a locking clutch operable releasably to connect a cage of the differential to an output portion of the drive means thereby to couple rotation of the cage of the differential to rotation of the output portion of the drive means.

\* \* \* \* \*